Feb. 18, 1930. C. HILDEBRANDT-SÓRENSEN 1,747,300
MACHINE FOR TREATING CRYSTALLIZED MARGARINE MASS AND THE LIKE
Filed March 14, 1927 7 Sheets-Sheet 1

INVENTOR
C. Hildebrandt-Sórensen
by
Langner Parry Card & Langner
Att'ys.

INVENTOR
C. Hildebrandt-Sórensen
by Langner, Parry, Card & Langner
Att'ys

Inventor:
C. Hildebrandt-Sórensen

INVENTOR
C. Hildebrandt-Sörensen.

Patented Feb. 18, 1930

1,747,300

UNITED STATES PATENT OFFICE

CARL HILDEBRANDT-SÖRENSEN, OF HVIDOVRE, DENMARK

MACHINE FOR TREATING CRYSTALLIZED MARGARINE MASS AND THE LIKE

Application filed March 14, 1927, Serial No. 175,389, and in Denmark March 16, 1926.

My invention relates to a machine for treating crystallized margarine mass and the like.

One object of the invention is to provide a continuously driven machine for the above named purpose, to which the mass can be fed without previous treatment after the water has been drained off and from which the margarine can be discharged ready for being packed. Another object of the invention is to provide a machine for treating margarine mass prepared from different raw materials of either vegetable or animal origin, and a further object of the invention is that, within reasonable limits, any desired consistency of the finished product can be obtained.

With these objects in view the invention consists in the various features and combinations of parts hereinafter described and claimed.

In the drawings

Figure 5 is a transverse section on the line V—V in Figure 3, Figures 6 and 7 are side views on a larger scale of two of the resistance elements of the same, between which are formed adjustable passages and a section of the surrounding casing.

Figure 6:
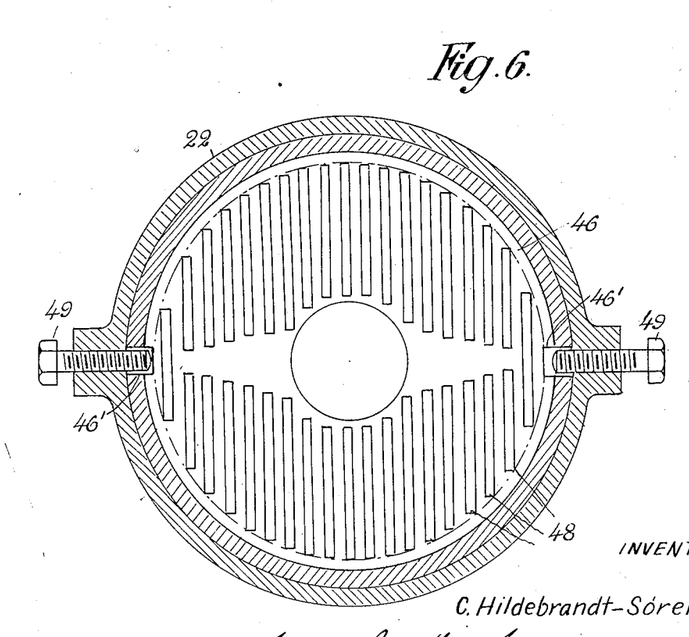
Figure 7:
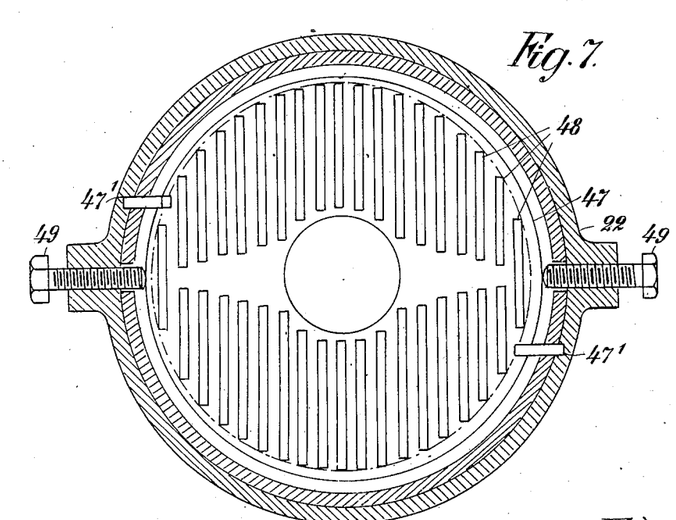
Figure 8:
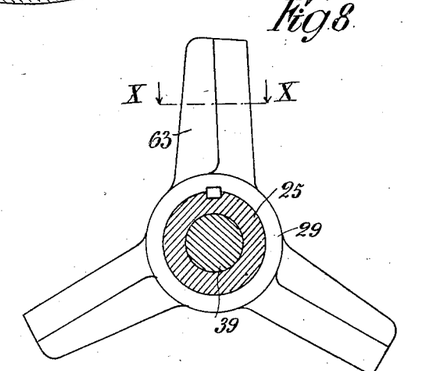
Figures 8 and 9 are side views of two of the propellers of the same.

In the embodiment of the invention shown in Figures 1–10 the active parts of the machine are enclosed within a casing 20 divided longitudinally along a horizontal plane through the axis of the machine, so that the upper half part can be removed when the active parts are to be inspected and cleaned. The casing 20 rests on a frame 21 and is formed as a tube shaped casing 22 branched off at the inlet end of the machine into two cylinders 23, the axes of which are parallel to the axis of the casing 22. In brackets 24, Figures 3 and 4, projecting from the frame 21 is journalled a shaft 25 coaxial to the casing 22 and carrying at one end a fixed pulley 26 and an idle pulley 27. To the end of the shaft 25 projecting into the casing 22 is secured a conveyor worm 28, Figure 3, and four propellers 29 which are shown in Figure 8 on a larger scale. The pitch of the conveyor worm 28 increases from the inlet end to the outlet end and the increase in pitch preferably amounts to ten per cent from turn to turn. In the casing 22 between the propellers 29 and at the out side of the last propeller are secured resistance elements 30, preferably consisting of perforated plates.

Figure 3:
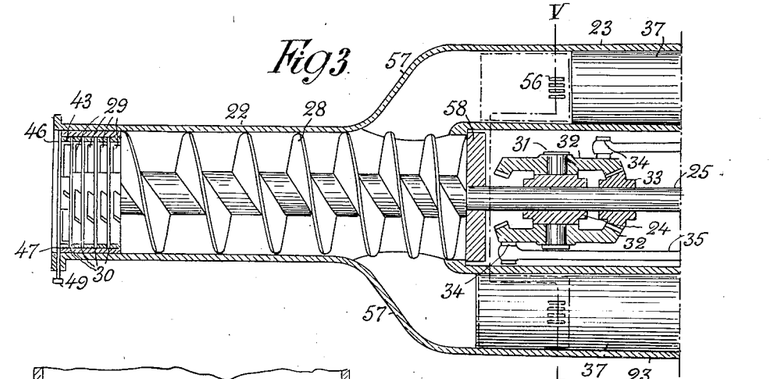
Figure 3 is a horizontal section of the midpart of the same, viz. the part between the lines A—B and C—D in Figure 1.

To one of the brackets 24 between the cylinders 23 are secured studs 31, Figure 3, which are coaxial and carry bevel gears 32 driven in opposite directions by a pinion 33 secured to the shaft 25. The gears 32 carry studs 34 connected by connecting rods 35 to studs 36, Figure 4, secured to pistons 37 working in the cylinders 23. The studs 36 pass through slots 38 in the cylinder walls.

Figure 4:
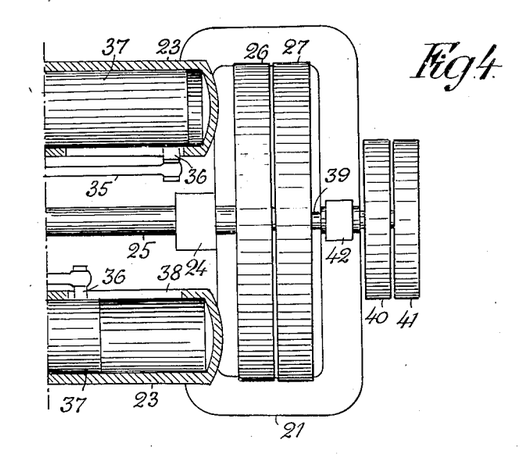
Figure 4 is a plan view partly in section of the end of the same at the right hand side of the line C—D in Figure 1.

The shaft 25 is hollow and through the whole length of this shaft extends another shaft 39, Figure 4, carrying at one end a fixed pulley 40 and an idle pulley 41. The shaft 39 is journalled in the shaft 25, for example by means of ball bearings (not shown), and furthermore journalled in a bracket 42 on the frame 21. The shaft 39 drives a number of propellers 43 and 44, Figure 2, and a conveyor worm 45. Between the first and the second of the propellers 43 two plates 46 and 47 are arranged in the casing 22 in a non-rotatable manner. These plates are shown in Figures 6 and 7 on a larger scale. The plates 46 and 47 are provided with oblong rectangular apertures 48 arranged in such a manner in the two plates that narrow slits are formed when the plates are placed side to side. The width of the slits can be varied by adjustment of screws 49 which are screwed through the casing 22. The ends of the screws 49 co-operate with the edge of the plate 47 the size of which is less than the bore of the casing 22, Figure 7. The screws 49 also serve to prevent rotation of the plate 46 thereby that they project into recesses 46' in this plate, Figure 6. The recesses 46' are of such a depth that they do not prevent the adjustment of the plate 47 by means of the screws 49. The plate 47 is guided during its displacement by pins 47' secured in the casing 22.

Between the remainder of the propellers 43 and between the last propeller and the conveyor worm 45 resistance elements 50, for example perforated plates, are secured in the casing 22.

Furthermore in the casing 22 are arranged other perforated plates 51 between the propellers 44.

To the end of the casing 22 is secured a delivery nozzle 52 the outlet of which may be of square configuration so that a suitable cross section is imparted to the mass leaving the machine.

Over the conveyor worm 45 a hopper 53 is arranged in the casing 22 serving to supply mixing ingredients to the mass subjected to treatment.

Figure 1:
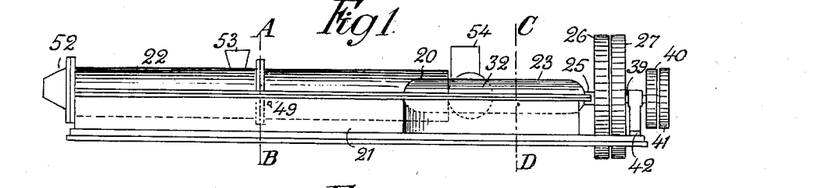
Figure 1 is a side view of an embodiment of a machine according to the invention.
Figure 2:
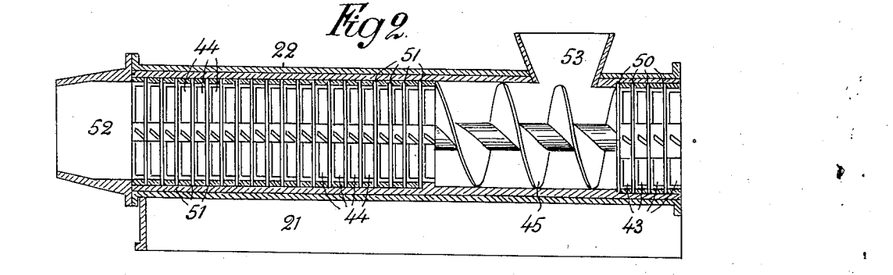
Figure 2 is a vertical section of the delivery end of the same on a larger scale showing the part at the left hand side of the line A—B in Figure 1.
Figure 5:
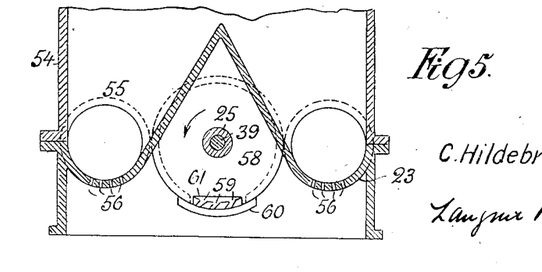

The machine is provided with a feeding hopper 54, Figures 1 and 5, the lower part of which is divided into two branches 55 debouching in the cylinders 23 at the part of their cavity in which the ends of the pistons 37 facing the casing 22 are travelling.

At the rearmost end of the said cavity one or more apertures are provided, preferably as shown, a number of slots 56, forming escape passages for the liquid extruded from the mass by means of the pistons 37.

The cylinders 23 are connected to the casing 22 by means of curved passages 57, Figure 3, debouching in the side wall of the casing at some distance from the right hand end as shown in Fig. 3 thereof. The end of the casing 22 is closed by means of a cover 58.

In the bottom of the casing 22 channels or grooves 59, Figure 5, are provided. These grooves may be worked out in an inserted piece 60 arranged in an opening in the wall of the casing 22. The grooves 59 may be wedge shaped and arranged inclined so that the cross section of the same takes the shape of saw teeth the cutting edges of which face towards the direction of movement of the conveyor worm indicated by the arrow in Figure 5. The grooves 59 serve for taking up the liquid driven out of the mass during its passage through a compression in the casing 22. The liquid flows away in a direction opposite to the direction of movement of the mass and leaves the machine through an opening 61 in the cover 58.

In using the machine the crystallized margarine is fed through the hopper 54. The machine is driven by means of belts which run over the pulleys 26 and 40 during the working period and are displaced to the pulleys 27 and 41 respectively when the machine is to be stopped. Preferably the shaft 39 is driven at a speed which is three times the speed of the shaft 25.

From the hopper 54 the margarine mass drops down into the cylinders 23 each time the pistons 37 are moved back and open the outlets from the branches 55. Preferably the pistons 37 work in opposite directions so that they alternately open for the feeding of the margarine mass and force the portions taken up in the cylinders 23 forward through the passages 57 and into the spaces between the threads of the conveyor worm 28. The gear wheels 32, 33 have such gearing that the mass pressed into the worm 28 during the forward movement of one piston is conveyed past the inlets of the passages 57 before the other piston from the opposite side forces new mass into the worm. By the action of the pistons 37 some liquid is extruded from the mass which liquid drains off through the slots 56.

The conveyor worm 28 conveys the mass forward in the casing 22 to the system of propellers and resistance elements. As the pitch of the conveyor worm increases in the direction of movement of the mass any tendency of the worm to compress the mass during the feeding thereof is removed so that the worm serves as a conveyor only. During the movement of the mass through the resistance elements and the propellers the mass is subjected to a gradually increasing kneading by its pressing through the holes in the plates 30 and by the treatment by the intermediate propellers. At the plates 46 and 47 the mass meets a considerable resistance to its passage in axial direction, the slits between these plates being adjusted to a relatively small width. The said width, in accordance with the desired water percentage in the treated product, amounts to 1/48–1/8 inch. The considerable amount of liquid extruded drains off through the grooves 59 and the opening 61 in a direction opposite to the direction of movement of the mass. On account of the special shape of the grooves there is no tendency for the mass to be pressed down into the grooves by the conveyor worm 28 and the propellers 29 but the liquid flows away along the grooves without any hindrance.

When the mass leaves the slits in the plates 46 and 47 the resistance against its passage decreases and no more liquid is extruded. The object of the further treatment is to effect a kneading and blending or mixing which provides for a suitable consistency and furthermore has the effect that the remainder of the water in the mass is emulsified. The kneading is performed during the passage through the plates 50 which preferably contain a great number of relatively small apertures, the diameter of which in accordance with the desired consistency amounts to 1/8–1/24 inch. The apertures may decrease from plate to plate in the direction of movement of the mass.

The kneaded mass leaving the last plate 50 is taken up by the conveyor worm 45 and conveyed towards the last group of plates 51 and propellers 44. After the passage through the plates 51 the finally treated mass leaves the machine through the nozzle 52 as a continuous stream which after having been divided into suitable lengths may be packed for distribution. To the mass conveyed by the worm 45, which mass is not subjected to any pressure, suitable mixing ingredients may be added through the hopper 53.

Figure 9:
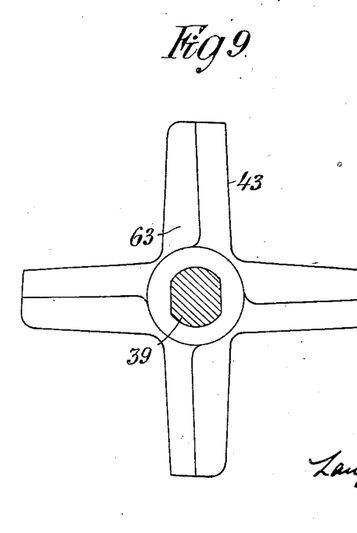
Figure 10:
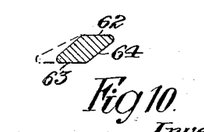
Figure 10 is a transverse section on the line X—X in Figure 8.

The propellers arranged between the resistance elements are of the multi-vane type as they comprise a number of vanes 63, Figures 8 and 9, the propellers 29 being provided with three vanes, the propellers 43 and 44 being provided with four vanes. As it appears from the drawings the resistance elements and the propellers are arranged alternately in close proximity and the leading and the following edges 62 and 63, Figure 10, respectively of the vanes lie in planes perpendicular to the propeller axis. At each propeller the leading edges are adjacent to the perforated plate arranged in front of the propeller and the following edges are adjacent to the perforated plate arranged behind the propeller. It is hereby obtained that the working surfaces 64 of the propellers lying foremost in the direction of movement by coaction with the perforated plates cut off the streams of margarine mass leaving the holes in the preceeding plate, the mass thereafter being pressed into the wedge shaped cavity between the surfaces 64 and the following perforated plate by the rotation of the propeller and thereby forced through the holes in the said plate. This action is highly appropriate to the mixing of the mass. It appears from the above statement that the propellers not only serve for kneading and mixing of the mass but also mainly as a means for conveying the mass through the machine. The surfaces 64 of the propellers lying foremost in the direction of movement are preferably substantially plane.

As it appears from the above description all of the propellers which are acting to mix the mass rotate with a greater speed than the propellers in the zone in which the extruding of the water takes place. Furthermore all of the propellers driven with the greatest speed have a greater number of vanes than the other propellers. This arrangement is due to the acknowledgement that a mixing is best performed by means of members moved rapidly through the mass while the kneading effecting the extrusion of the water ought to be performed by members moved through the mass with a relatively low speed.

In the embodiment described the shafts 25 and 39 are driven independently of each other by separate belts so that the proportion between the speeds of the said axes can easily be varied. This fact is of importance for treatment of mass of different raw materials as some raw materials require an intense mixing but possibly not a high pressure; for other materials the inverse circumstances may be present. Therefore it is suitable in each case to be able to select the speed of the mixing members independently of the speed of the pressing members. If a material is to be treated which requires a slight mixing a greater or less number of the propellers 44 and the resistance elements 51 may be removed from the machine and substituted by inoperative members in order to save power in the treatment of the material.

In the embodiment shown in Figures 11 to 17 100 designates the divided casing of the machine resting on uprights 101 secured to a bottom plate 102. The casing 100 is formed as a tube shaped casing 103 and two cylinders 104, one cylinder being arranged at each side of the casing 103. The axes of the cylinders are parallel to the axis of the casing. The forward ends of the cylinders are connected to the casing 103 by curved passages 105 which debouche at opposite sides of the casing at some distance from the forward end thereof. This end of the casing 100 is secured to a divided box 106 secured to the bottom plate 102 and containing the gearing means of the machine.

The drive shaft 107 of the machine extends through the box 106 and coaxially through the casing 103. The shaft 107 is journalled in ball bearings 108, Figure 11, and 109, Figure 14, and is driven by means of a pulley 110 secured to one end of the shaft. Outside this pulley an idle pulley 111 is journalled on the shaft 107.

In the casing 103 works a conveyor worm 112 and five four-vane propellers 113 cast in one piece with the hub 114 of the worm 112 which hub projects through considerable distance beyond the thread at each end. The hub 114 is arranged freely rotatable on the shaft 107 by means of ball bearings or other suitable means and is driven therefrom by means of a gearing 115, 116, 117, 118 arranged in the box 106, with a speed which preferably is one fourth of the speed of the shaft 107. From the hub 114 is driven through a screw wheel gearing 119, 120 a horizontal shaft 121 journalled in the box 106 at right angles to the shaft 107. The ends of the shaft 121 projecting outside the box 106 carry cranks 122 extending in opposite directions. The said cranks drive connecting rods 123 which by means of levers 125 arranged at the other end of the machine and swingable about studs 124 drive connecting rods 126 connected to pistons 127 working in the cylinders 104.

In the left hand end of the casing 103 is inserted a cup shaped member or box 136 the bottom of which is provided with a lug 137 receiving the ball bearing 109. Around the lug 137 the bottom of the box is provided with apertures 153. In the box 136 are arranged perforated plates 139 secured at equal distances for which purpose the plates are provided with circumferential flanges 140 which are clamped together and against a tubular member 154 arranged innermost in the box when the outlet nozzle 141 of the machine is secured to the casing 103 whereby also the box 136 is clamped to the said casing. The holes in the plates 139 are preferably tapered or cone shaped in such a manner that the diameter of the holes in each plate decreases in the direction towards the delivery end of the machine. Between the plates 139 propellers 142 are secured to the shaft 107. These propellers are similar to the propellers 43, Figure 9, in the foregoing embodiment.

Figure 12:
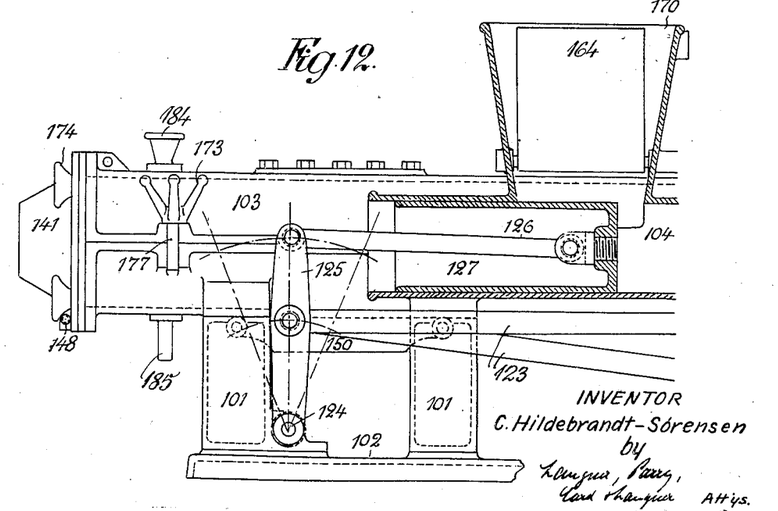
Figure 12 is a side view partly in section on the line XII—XII in Figure 15 of the left hand half part of the same.
Figure 13:
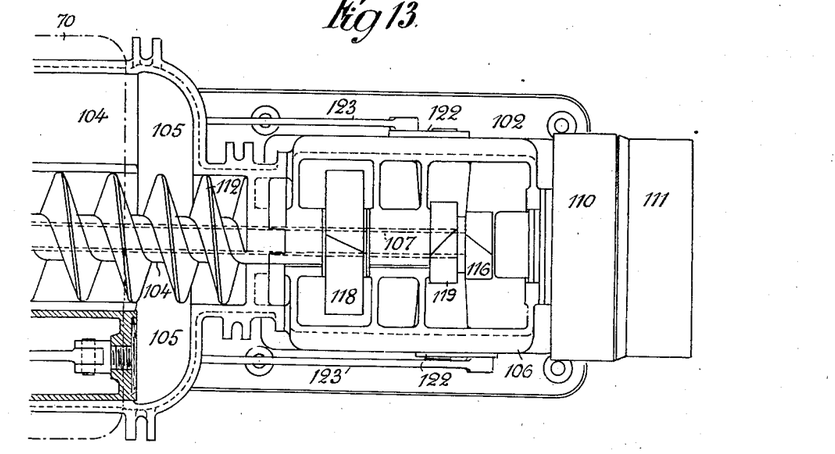
Figure 13 is a plan view partly in section of the right hand half part of the same the upper half part of the casing of the machine being removed.
Figure 14:
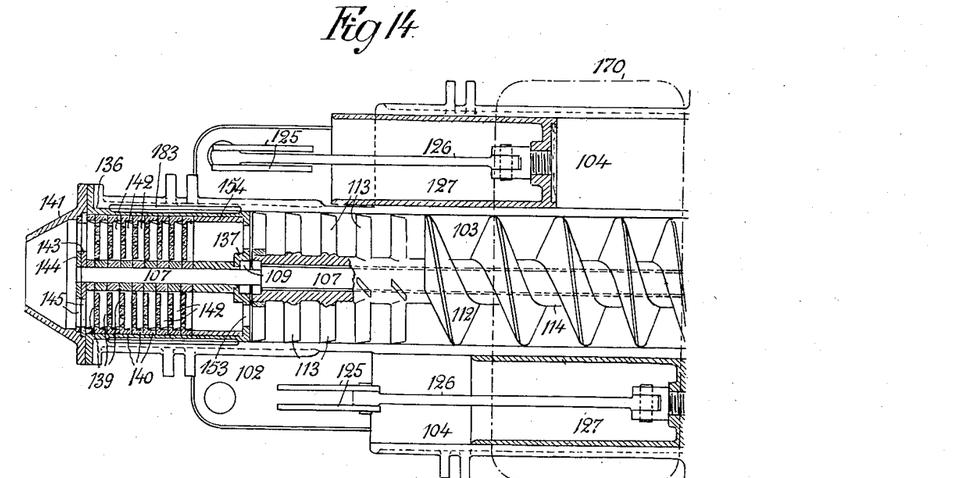
Figure 14 is a plan view partly in section of the left hand half part of the same, the upper half part of the casing being removed.

In the nozzle 141 are arranged two plates 143 and 144 provided with trapezium shaped apertures arranged radially about the center of the plates. The plate 143 is held stationary by being clamped between the box 136 and the nozzle 141 while the plate 144 can be adjusted by rotation about its axis. The adjustment is performed by means of an arm 146 with which the plate 144 is provided Figure 17, which can be moved to and fro in a corresponding recess in a lug 147 on the nozzle 141. The arm 146 is adjusted by means of screws 148, one of which only is shown in Figure 12. The apertures in the plates 143 and 144 are of equal shape and they have substantially the same shape and width as the ribs between the apertures, so that the two plates form in unison a valve by means of which the passage can be closed or opened, the maximum area of the cross section of the passage being equal to the total area of all of the apertures in one plate. The plates 143 and 144 correspond to the plates 46 and 47 of the foregoing embodiment. As to the first named plates the adjustment is performed by rotation of one plate, as to the last named plates the adjustment is performed by linear displacement of one plate.

Figure 17:
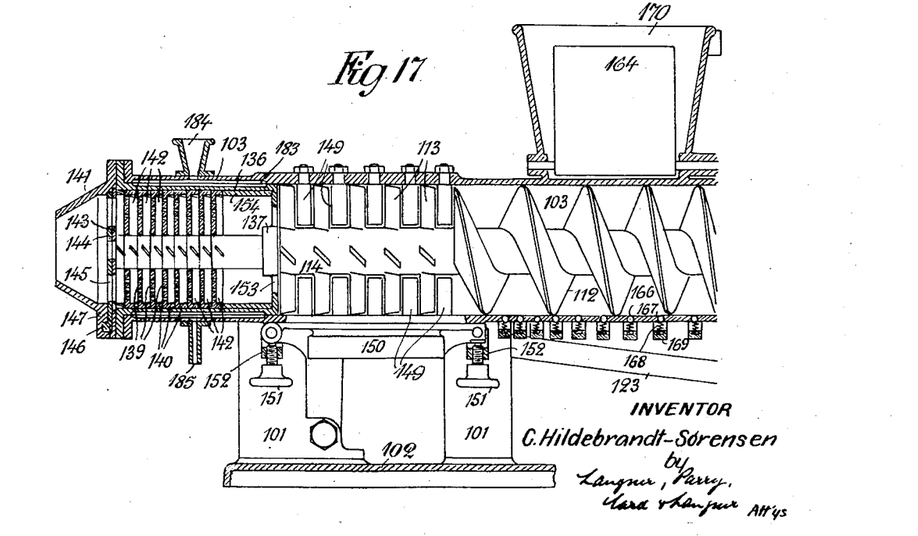
Figure 17 is a section on the line XVI—XVI in Figure 15 of the left hand half part of the same.

To the top and bottom of the casing 103 are secured members or studs 149, Figure 17, projecting into the spaces between the propellers 113 and into the space between the conveyor worm 112 and the first propeller. The lower studs 149 are cast in one piece with a cover 150 clamped to the bottom of the casing 103 by means of screws 151 which intermesh with internal threads in curved members 152 pivoted to the casing 103. For inspection of the kneading zone of the machine the cover 150 is removed.

Figure 16:
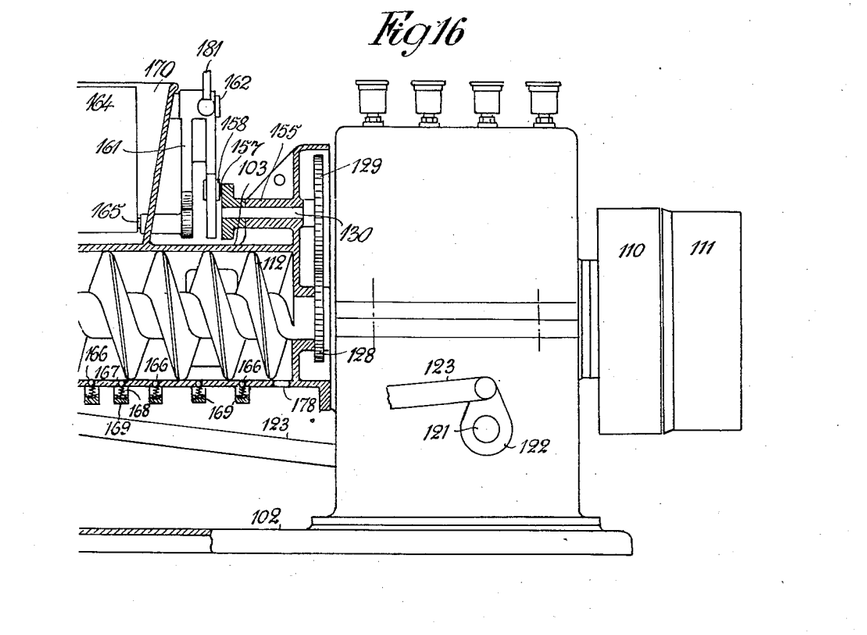
Figure 16 is a side view partly in section on the line XVI—XVI of the right hand half part of Figure 15.

In the casing 103 beneath the conveyor worm 112 a number of ball valves 166 are arranged serving to carry off liquid which leaves the mass during its feeding by means of the conveyor worm 112 and the liquid which flows back through the casing 103 from the pressing zone at the propellers 113. Normally the valves 166 are forced against their seats by means of screw springs 168 supported by brackets 169, the ends of which are secured to the casing 103. When the thread of the worm passes a ball valve 166 the ball is pressed downward so that the liquid in the casing 103 in the proximity of the valve is permitted to escape. After the passage of the thread the valve 166 is again lifted into contact with its seat by means of the corresponding spring 168. The valves 166 are arranged along the casing 103 underneath the conveyor worm 112 in such a manner that the greater number thereof is found at the delivery end of the worm where a considerable amount of liquid extruded by the action of the propellers 113 is present. During the opening of the valves 166 the part of the thread of the worm 112 which effects the opening prevents the mass leaving the casing 103 through the valve but a sufficient space is present between the edge of the thread and the wall of the casing for allowing the liquid to escape. At the end of the casing 103 in front of the channels 105 a relatively large opening 178, Figure 16, is present through which the liquid not discharged through the valves 166 can flow away. As no mass is found at the front end of the conveyor worm 112 no valve is needed in the opening 178.

In the same way as in the foregoing embodiment the mass to be treated is fed to the cylinders 104 through a hopper 170. To secure that the mass fed to the hopper drops down in the cylinders 104 a swingable vane 164 is arranged in the hopper. This vane is driven from the main drive of the machine in synchronism with the pistons 127.

From the hub 114 a shaft 130 is driven through a gearing 128, 129, the said shaft being arranged over the casing 103 and journalled in a bearing 155. To the end of the shaft 130 is secured a disc 156 carrying a crank pin 157. This pin is enclosed by a ball bearing 158 which during the rotation of the disc 156 works in a slot 159, Figure 15, at the free end of an arm 160 integral with a toothed sector 161. The arm 160 and the sector 161 are pivoted to the hopper 170 by means of a stud 162. The teeth of the sector 161 intermesh with a gear 163 secured to the shaft 165 of the vane 164. When the arm 160 is oscillated to and fro by means of the crank pin 157 by the engagement of the teeth of the sector and the gear 163 the vane is oscillated to and fro from the position shown in dotted lines in Figure 15 to a position symmetrical therewith with regard to the section line XVI—XVI.

The action of the machine shown in Figures 11–17 is mainly the same as that described in connection with the foregoing embodiment. A fundamental difference between the two embodiments resides in the arrangement of the adjustable plates 46, 47 and 143, 144 respectively. In the last described embodiment these plates are arranged at the delivery end of the machine and as these plates produce the main part of the resistance to the passage of the mass through the machine a considerable pressure is present in the pressing and kneading zone which is found at the propellers 113 and the studs 149 and in the mixing or blending zone which is found in the box 136. In the embodiment first described the adjustable plates are arranged in front of the mixing zone so that the pressure in this zone is relatively low. This difference, however, does not involve any perceptible change in the character of the action of the machine. The adjustable plates may be substituted by a single plate with a constant section of passage.

Figure 15:
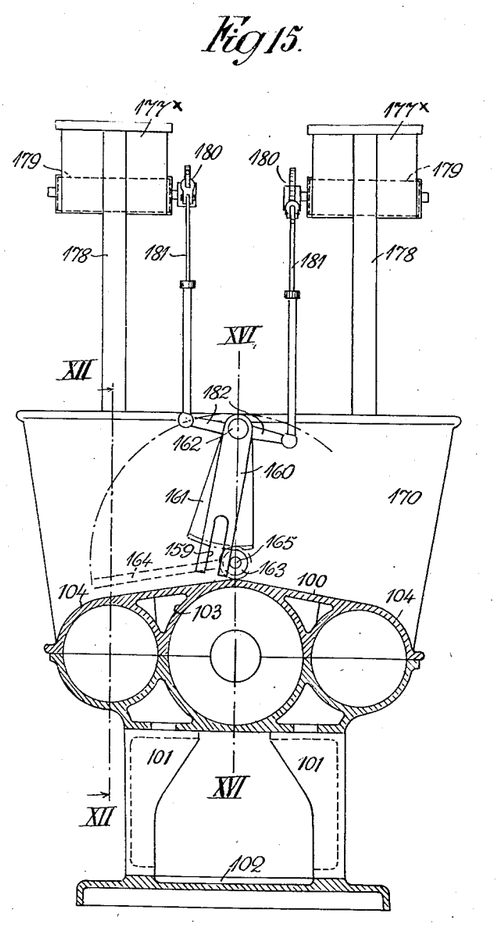
Figure 15 is a transverse section of the same on the line XV—XV in Figure 11.

Over the hopper 170 two containers 177ˣ, Figure 15, are arranged containing salt and other mixing ingredients. The containers 177ˣ are secured to uprights 178 carried by the hopper 170, and the bottoms of the containers are formed by fluted rollers 179. By the rotation of the rollers 179 the material in the containers 177ˣ is successively carried to the hopper 170. The rollers are driven by means of pawl mechanisms 180 of the kind used in oil pumps. These mechanisms are driven by means of telescopic connecting rods 181 connected to arms 182 which are integral with the arm 160.

Between the casing 103 and the box 136 an annular space 183 is provided. Through this space hot water or the like can be conducted for the purpose of heating the mixing zone of the machine when the machine is stopped with mass therein thereby preventing the mass stiffening in the machine which renders the subsequent starting of the machine difficult. The water is led to the space 183 through a hopper 184 and is discharged through a pipe 185.

The upper half of the casing 100 is secured to the lower part thereof by means of swing bolts 177, Figure 12, with wing nuts 173 so that the bolts can easily be loosened and then swung out when the upper part is to be removed. The nozzle 141 is also secured to the casing 100 by means of wing nuts 174 which can likewise easily be loosened for removal of the upper half of the casing when the interior of the machine is to be inspected and cleaned.

Figure 11:
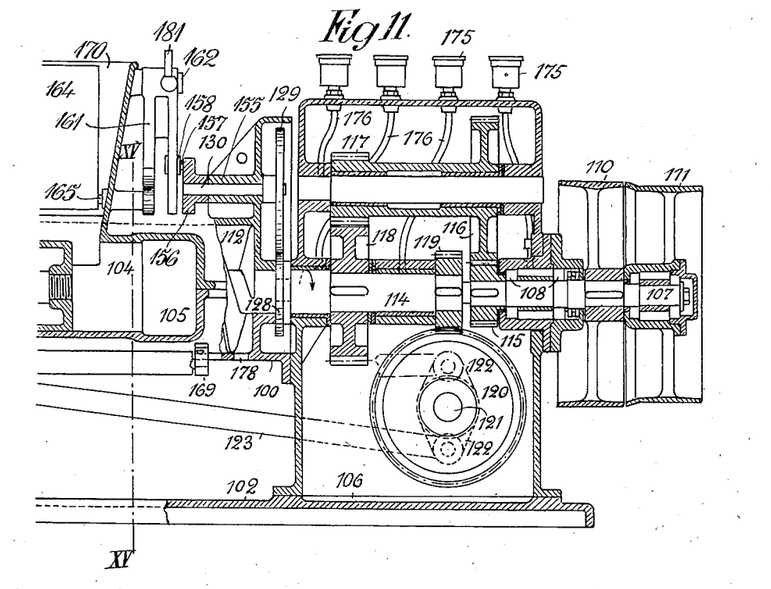
Figure 11 is a vertical section of the right hand half part of another embodiment of the invention.

The bearings for the gearings in the box 106 can be lubricated by oil cups 175, Figure 11, arranged at the top of the box and connected to the different bearings by pipes 176.

The machine forming the subject matter of the invention can be built in different manners without departing from the spirit of the invention. For example the total number of resistance elements can be increased or decreased and all of the propellers can be driven with the same speed. The adjustable plates between which are formed the narrow apertures for the passage of the mass may be substituted by a single plate or other resistance element with constant cross section area of the passage as previously mentioned. In the embodiments shown the axes of the feeding cylinders are parallel to the axis of the conveyor worm in order to restrict the transverse dimension of the machine but the cylinders may, if desired, be arranged perpendicularly to the casing.

Having thus fully described my invention I claim as new and desire to secure by Letters Patent:

1. Machine for treating margarine mass containing a considerable amount of liquid comprising a casing, a number of spaced rotatable propellers arranged in the said casing, a number of studs secured to the said casing and projecting therefrom towards the propeller axis in a number of the spaces between the said propellers, and a number of perforated plates arranged in the remainder of the spaces between the said propellers.

2. Machine for treating margarine mass and the like comprising a casing, at least two groups of spaced rotatable propellers, each of the said groups being secured to a shaft, one of the said shafts extending through the other of said shafts a number of studs secured to the casing and projecting therefrom towards the propeller axis in the spaces between the propellers in one group, and a number of perforated plates arranged in the spaces between the other propellers.

3. Machine for treating margarine mass and the like comprising a casing, at least two groups of spaced rotatable propellers arranged in the said casing, means for driving the two groups of propellers at different peripheral speeds, a number of members secured to the casing and projecting towards the axis of the machine in the space between the propellers in one group, a number of perforated plates arranged in the spaces between the other propellers, and a device containing narrow apertures for the passage of the mass.

4. Machine for treating margarine mass and the like comprising a casing, at least two groups of spaced propellers arranged in the said casing, means for driving the two groups of propellers at different peripheral speeds, a number of members secured to the casing and projecting towards the axis of the machine in the spaces between the propellers in one group, a number of perforated plates arranged in the spaces between the other propellers and an adjustable device containing narrow apertures for the passage of the mass.

5. In a machine for treating margarine mass and the like two cylinders, two pistons working alternately in the said cylinders, a casing and a conveyor worm working in the said casing, the said cylinders being connected to the said casing at opposite sides thereof.

6. In a machine for treating margarine mass and the like a casing, a conveyor worm working in the said casing and having increasing pitch in the direction of movement of the mass, at least one fixed inlet opening at one end of the said casing, another casing, at least two groups of spaced rotatable propellers arranged in the said casing, means for driving the two groups of propellers at different peripheral speeds, a number of members secured to the casing and projecting towards the axis of the machine in the spaces between the propellers in one group, a number of perforated plates arranged in the spaces between the other propellers, and a device containing narrow apertures for the passage of the mass 7. Machine for treating margarine mass and the like material containing liquid comprising mechanism forming a treatment zone in which a kneading of the mass is effected, a casing connected to that part of the machine included in the said treatment zone, a conveyor worm working in the said casing and having increasing pitch in the direction of movement of the mass and serving to feed the material to the treatment zone and to lead off in the opposite direction a material part of the liquid contained in the material under treatment.

8. In a machine for treating margarine mass and the like a cylinder, a piston working in the said cylinder, a casing and a conveyor worm working in the said casing, the cylinder being connected to the said casing, the bottom of the casing being provided with apertures, the said apertures being controlled by automatic valves.

9. In a machine for treating margarine mass and the like a casing the bottom of which is provided with apertures, a conveyor worm working in the said casing, the said apertures being controlled by valves affected by the threads of the worm.

10. Machine for treating margarine mass and the like comprising two cylinders, two pistons working alternately in the said cylinders, a casing, a conveyor worm working in the said casing, the said cylinders being connected to the said casing at opposite sides thereof, another casing connected to the first named casing, a number of spaced rotatable propellers arranged in the said second casing, a number of resistance elements arranged in the spaces between the said propellers, and a device provided with narrow apertures for the passage of the mass.

11. Machine for treating margarine mass and the like comprising two cylinders, two pistons working alternately in the said cylinders, a casing a conveyor worm working in the said casing, at least two groups of propellers, each of the said groups being secured to a shaft, one of the said shafts extending through another of said shafts, and means for driving the pistons, the conveyor worm, and the said shafts from a common source of powers.

12. Machine for treating margarine mass and the like comprising two cylinders, two pistons working alternately in the said cylinders, a casing, a conveyor worm working in the said casing, a second casing, at least two groups of spaced propellers working in the said second casing, means for driving the groups of propellers at different speeds, a number of members secured to the last named casing and projecting towards the axis of the machine in the spaces between the propellers in one group, a number of perforated plates arranged in the spaces between the other propellers, and a device containing narrow apertures for the passage of the mass.

13. Machine for treating margarine mass and the like comprising a cylinder, a piston reciprocating in the said cylinder, a casing, a conveyor worm working in the said casing, the said cylinder being connected to said casing, the second casing connected to the first named casing, two groups of spaced propellers arranged in the said second casing, a space being provided between the groups of propellers which space is greater than the spaces between the propellers in any group, the two groups of propellers being driven at different speeds, a number of studs secured to the casing of the propellers and projecting therefrom towards the propeller axis in the spaces between the propellers in one group, and a number of plates arranged between the propellers in the other group and provided with holes, the holes in each plate being of decreasing diameter in the direction of movement of the mass.

14. Machine for treating margarine mass and the like comprising a conveyor worm with increasing pitch in the direction of movement of the mass, two groups of spaced propellers, a space being provided between the said groups which space is greater than the space between the propellers in each group, means for driving the two groups of propellers at different peripheral speeds, a casing surrounding the said propellers, a number of studs projecting from the said casing towards the propeller axis in the spaces between the propellers in one group, a number of plates arranged between the other propellers and provided with tapered holes, and a device provided with narrow apertures for the passage of the mass.

In testimony whereof I have affixed my signature.

CARL HILDEBRANDT-SÓRENSEN.